US007401818B2

(12) United States Patent
Takayanagi

(10) Patent No.: US 7,401,818 B2
(45) Date of Patent: Jul. 22, 2008

(54) QUICK CONNECTOR

(75) Inventor: Akira Takayanagi, Aichi-ken (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 10/442,387

(22) Filed: May 21, 2003

(65) Prior Publication Data

US 2003/0218334 A1   Nov. 27, 2003

(30) Foreign Application Priority Data

May 23, 2002   (JP) ............................... 2002-149176
May 20, 2003   (JP) ............................... 2003-142291

(51) Int. Cl.
*F16L 39/00*   (2006.01)
(52) U.S. Cl. ...................................... 285/319; 285/305
(58) Field of Classification Search ................. 285/319, 285/305, 93, 330, 913, 914, 314, 328, 351, 285/921
See application file for complete search history.

(56) References Cited

U.S. PATENT DOCUMENTS

| | | | | |
|---|---|---|---|---|
| 5,112,084 A | * | 5/1992 | Washizu | 285/319 |
| 5,297,818 A | | 3/1994 | Klinger | |
| 5,343,892 A | * | 9/1994 | Saito | 137/614.04 |
| 5,441,313 A | * | 8/1995 | Kalahasthy | 285/93 |
| 5,456,500 A | * | 10/1995 | Klinger et al. | 285/93 |
| 5,893,590 A | * | 4/1999 | Klinger et al. | 285/319 |
| 6,129,393 A | | 10/2000 | Kodama et al. | |
| 6,186,561 B1 | * | 2/2001 | Kaishio et al. | 285/319 |
| 6,302,451 B1 | * | 10/2001 | Olson | 285/330 |

FOREIGN PATENT DOCUMENTS

| | | |
|---|---|---|
| JP | B57-54642 | 11/1982 |
| JP | 05-209607 | 8/1983 |
| JP | 58-148306 | 9/1983 |
| JP | A58-193932 | 11/1983 |
| JP | 60-177921 | 9/1985 |
| JP | B61-51681 | 11/1986 |
| JP | 63-48814 | 12/1988 |
| JP | A08-4721 | 1/1996 |

(Continued)

OTHER PUBLICATIONS

Notification of Reasons for Refusal in Japanese Patent Application No. 2003-42291; JPO; May 28, 2007.

(Continued)

*Primary Examiner*—Aaron Dunwoody
(74) *Attorney, Agent, or Firm*—Andrus, Sceales, Starke & Sawall, LLP

(57) ABSTRACT

An engagement protrusion is formed in square in cross-section integrally on an outer surface of a main body of a retainer, and is provided on a position opposed to a space for deformation so as to extend from an opposite axial end to short of an axial center of the main body of the retainer. An engagement recess is formed generally identical in cross-section to the engagement protrusion on an inner peripheral surface of a retainer holding portion so as to extend from an opposite axial end of the retainer holding portion to one axial end of a raised portion. The retainer is fitted in the retainer holding portion so that the engagement protrusion is inserted in the engagement recess.

10 Claims, 16 Drawing Sheets

FOREIGN PATENT DOCUMENTS

| | | |
|---|---|---|
| JP | B2591517 | 12/1996 |
| JP | 9-178000 | 7/1997 |
| JP | 09-329284 | 12/1997 |
| JP | 10-503831 | 4/1998 |
| JP | 11-201355 | 7/1999 |
| WO | WO 96/18842 | 6/1996 |

OTHER PUBLICATIONS

English translation of the claim of Japanese Patent Application Publication No. 58-148306. (1983).

Patent Abstract of Japan for Japanese Patent Application Publication No. 9-178000.

* cited by examiner

QUICK CONNECTOR

CROSS REFERENCE TO RELATED APPLICATION

The present application claims priority from Japanese Patent Application No. 2002-149176 (149176/2002), filed May 23, 2002 and Japanese Patent Application No. 2003-14229 (142291/2003), filed May 20, 2003.

BACKGROUND OF THE INVENTION

The present invention relates to a quick connector, for example, to be adapted in assembly in a gasoline fuel piping of an automobile.

In a fluid piping structure, for example, a gasoline fuel piping structure where a tube is joined to a pipe, a connector is used for joining the tube to the pipe. In such piping system, for example, as shown in U.S. Pat. No. 6,129,393, a pipe includes an inserting end portion on one axial side thereof wherein an annular engagement projection is formed on and around an outer peripheral surface. Then, the inserting end portion of the pipe is inserted and fitted in the connector so that the annular engagement projection snap-engages with the connector to provide locking relation between the pipe and the connector, thereby connection between the pipe and the connector is completed. A quick connector adapted in this manner comprises a tubular connector housing and a retainer. The tubular connector housing is provided with a tube connecting portion on one axial side and a retainer holding portion on an opposite axial side thereof. The retainer has a main body formed with a pipe engagement portion to be snap-engaged with an annular engagement projection of the pipe and is fitted in the retainer holding portion. The pipe is inserted in this retainer so that the annular engagement projection of the inserting end portion snap-engages with the pipe engagement portion of the retainer and is thereby fitted in and connected with the connector.

The man body of the retainer is shaped annular or generally annular. And, for example, an engagement window or windows are formed on the retainer holding portion, while an engagement tab or tabs are provided on the main body of the retainer. In such configuration, the retainer is fitted in the retainer holding portion so that the engagement tab or tabs snap-engage in the engagement window or windows. The main body of the retainer, according to U.S. Pat. No. 6,129,393, is formed in C-shape (generally in annular shape) in cross-section to provide sufficient resilient deformability. Thus configured retainer serves for easy fit-in and release operation with respect to a retainer holding portion.

Meanwhile, in a retainer fitting structure wherein a C-shaped retainer or any other retainer having a main body with a space for deformation generally along an entire axial length, long axially, or relatively long axially is adapted, the main body is easily deformed inwardly in the retainer holding portion due to this space for deformation. That is, when external force is exerted on the a main body, especially on an opposite axial side thereof, the main body may be easily deformed inwardly so that the engagement tab or tabs escape out of the engagement window or windows. Then, the retainer rotates with respect to the retainer holding portion. Otherwise, depending on the direction of external force exerted, or if external force is exerted repeatedly, there is a fear that the retainer moves in an inclining direction with respect to an axial direction of the retainer holding portion, and thereby the retainer is released and falls out of the retainer holding portion. In such a case, an operator must fit the retainer in the retainer holding portion correctly and then implement connecting work of a pipe and a connector once again. Therefore, according to need, a rotation preventive means or a retaining means is configured between the retainer and the retainer holding portion to prevent that the retainer rotates in the retainer holding portion or the retainer falls out of a retainer holding portion. As for retainer rotation preventive means or retainer retaining means, an indent formed on one axial end portion of the main body of the retainer and a rotation preventive projection formed on one axial end portion of an inner peripheral surface of the retainer holding portion may be adapted. In this instance, the rotation preventive projection is fitted in the indent. Or, as disclosed in U.S. Pat. No. 5,297,818, a protrusion formed protruding radially outwardly on one axial end portion of a retainer and a recessed portion provided in an inner peripheral surface of a retainer holding portion may be adapted. In this configuration, the protrusion is fitted in the recessed portion.

However, in a retainer fitting structure, for example, as disclosed in U.S. Pat. No. 6,129,393, wherein operation arms are provided on a retainer, an external force is likely to be exerted on an opposite axial end portion of the retainer. A rotation preventive means or retaining means constructed with respect to one axial end portion of the retainer may not function to prevent the retainer from rotating or moving in inclining direction with respect to an axial direction of the retainer holding portion.

SUMMARY OF THE INVENTION

Accordingly, it is an object of the present invention to provide a quick connector with excellent function of retaining a retainer in a retainer holding portion of a connector housing.

In order to achieve a foregoing object, there is provided a novel quick connector to be connected with a pipe which has an inserting end portion formed with an annular engagement projection, for example, on one axial side thereof.

The quick connector has a tubular connector housing. The tubular connector housing is provided with a tube connecting portion to be connected with a tube (including a hose or the like) on one axial side thereof or one side in a direction of an axis of the quick connector or the connector housing, and a retainer holding portion on an opposite axial side thereof or an opposite side in a direction of an axis of the quick connector or the connector housing. The quick connector also has a retainer fitted in and held by or in the retainer holding portion, and the retainer has an annular or generally annular main body formed with a pipe engagement portion so as to snap-engage with the annular engagement projection of the pipe when the inserting end portion of the pipe is inserted in the connector housing. An engagement recess is formed in an inner peripheral surface of the retainer holding portion so as to extend from an opposite axial end to or toward one axial side thereof. And, an engagement protrusion is formed integrally at least on an opposite axial side (namely, an opposite side in an axial direction of the quick connector, the connector housing or the retainer holding portion) of an outer surface of the main body so as to protrude or project radially outwardly. The engagement protrusion is fitted in the engagement recess in engagement relation circumferentially. An opposite axial side of the main body of the retainer is directly securely locked against rotational movement with respect to the retainer holding portion as the engagement protrusion engages in the engagement recess circumferentially on an opposite axial side of the main body. Consequently, if an external force is exerted on an opposite axial side of the retainer, the retainer is restrained from rotating with respect to the retainer holding portion. In some cases, a retainer may be consist only of the main body. The engagement protrusion may be formed so as to extend axially (namely, in an axial direction of the quick connector, the connector housing or the retainer holding portion) with suitable length, for example, from an opposite axial end (namely, an opposite end in an axial direction of the quick connector, the connector housing or the retainer holding portion) to an axial center of the main body, or to just short of one axial end portion thereof.

The retainer has a main body including a pipe engagement portion, for example, on one axial end portion thereof, and the main body may be formed with engagement tabs in diametrically symmetrical positions of an opposite axial end portion thereof respectively. Also, the retainer may be formed in C-shape or any other shape with a space defined between the engagement tabs for deformation. A retainer holding portion may be formed with engagement windows in radially opposed relation with one another. In this configuration, the retainer is fitted in the retainer holding portion so that the engagement tabs snap-engage in the engagement windows respectively. The present invention is applicable for a quick connector with such retainer and retainer holding portion. In this instance, an engagement protrusion is provided, for example, between the engagement tabs on an outer surface of the main body, i.e. on a side opposed to the space for deformation on an outer surface of the main body. And, an engagement recess is formed, for example, between the engagement windows on inner peripheral surface of the retainer holding portion. The retainer is often provided with operation arms respectively extending from a position of engagement tab in an opposite axial direction.

The engagement protrusion of the retainer is formed, for example, in square or rectangular (including generally square or rectangular shape) in cross-section, while the engagement recess of the retainer holding portion may be formed also in square or rectangular (including generally square or rectangular shape) in cross-section. Meanwhile, especially in case of adopting a retainer fitting structure including a retainer such as C-shape retainer with a space for deformation, the larger the retainer holding portion or the retainer is formed in diameter, the more easily and significantly the retainer is apt to be deformed. Therefore, in case that the retainer of large diameter is applied, if external force is exerted radially inwardly on an opposite axial side of the retainer, the retainer easily moves or is displaced in an inclining direction with respect to an axis of the retainer holding portion, and falls out of the retainer holding portion. When the retainer falls out of the retainer holding portion, connecting work of a pipe will be considerably troublesome. Thanks to circumferentially engagement relation between the engagement protrusion and the engagement recess, it is also effectively prevented that the retainer falls out of the retainer holding portion like this. However, if the engagement protrusion and the engagement recess are formed in square or rectangular in cross-section, the retainer is still likely to be displaced so as to misalign with an axis of the retainer holding portion. And, depending on the direction of the external force exerted, the retainer might fall out easily. Therefore, preferably the engagement protrusion and the engagement recess are in engagement relation with one another also radially or in a direction perpendicular to the axis. Then, the engagement protrusion may be formed in trapezoid (including generally trapezoid shape) in cross-section, for example, where the both sides radially inward and outward (namely, inward and outward in a radial direction of the quick connector, the connector housing or the retainer holding portion) are parallel and the radially outward one is longer than the other, while the engagement recess may be formed, for example, in trapezoid (including generally trapezoid shape) in cross-section, so as to correspond or conform to the engagement protrusion. If the engagement protrusion and the engagement recess are formed as such, the engagement protrusion engages in the engagement recess also radially. And it avoids difficulties in fitting the retainer in the retainer holding portion to adopt an engagement structure including a protrusion and a recess of trapezoid in cross-section. Alternatively, the engagement protrusion may be formed in T-shape (including generally T-shape) in cross-section for example, of which cross-bar is located radially outside, the engagement recess may be formed, for example, in T-shape (including generally T-shape) in cross-section, so as to correspond or conform to the engagement protrusion. If the engagement protrusion and the engagement recess are formed as such, the engagement protrusion engages in the engagement recess radially as well. And a stable radial engagement relation may be constructed by adopting an engagement structure including a protrusion and a recess of T-shape in cross-section.

In order to enhance retention ability with respect to the retainer, it is required to form the engagement protrusion high and the engagement recess deep. However, it is not a rare case that a peripheral wall of the retainer holding portion is relatively thin-walled, a deep engagement recess cannot be formed in a thickness thereof. Therefore, preferably the retainer holding portion is provided with a portion raised radially outwardly on a peripheral wall thereof and the engagement recess is defined by, in or on the portion raised radially outwardly.

Also, in order to enhance retention ability with respect to the retainer, preferably a rotation preventive means or retaining means is provided along entire axial length or along generally entire axial length of the main body of the retainer. In such configuration, it is conceived that the engagement recess is formed along entire axial length, generally entire axial length of the retainer holding portion and the engagement protrusion is formed along entire a length or generally along entire axial length of the retainer or the main body. However, in order to form the engagement recess along entire axial length or generally entire axial length of the retainer holding portion, the portion raised radially outwardly might be formed along entire length or generally along entire length thereof. Then, it becomes impossible to provide another functional structure additionally on an outer peripheral surface of the retainer holding portion. And, for example, it becomes impossible to fit a checker for verifying complete connection between the quick connector and the pipe on the retainer holding portion. Then, it is advantageous to configure a rotation preventive means with respect to one axial side (namely, one side in an axial direction of the quick connector, the connector housing or the retainer holding portion) of the retainer by providing an indent on one axial end portion of the main body of the retainer and a rotation preventive projection on one axial end portion of an inner peripheral surface of the retainer holding portion to be received in and engaged with the indent circumferentially. In this instance, preferably a plurality of indents are formed in side by side relation with one another circumferentially with intervening a narrow parting section or sections extending in one axial direction (namely, toward one side in an axial direction of the quick connector, the connector housing or the retainer holding portion) therebetween, and a plurality of rotation preventive projections are formed on one axial end portion of the inner peripheral surface of the retainer holding portion so as to fit in and engage with circumferentially the indents respectively. Thus configured structure effectively prevents that the indent easily disengages from the rotation preventive projection due to increased engaging portions between one axial end portion of the retainer and the rotation preventive projections.

A quick connector of the present invention can effectively prevent that a retainer rotates with respect to a retainer holding portion or falls out of the retainer holding portion as an engagement means, namely a rotation preventive means or retaining means is constructed to bring about a secure engagement relation between the retainer and the retainer holding portion of a connector housing.

Now, the preferred embodiments of the present invention will be described in detail with reference to the drawings.

DETAILED DESCRIPTION OF THE PREFERRED EMBODIMENTS

Figure 1:
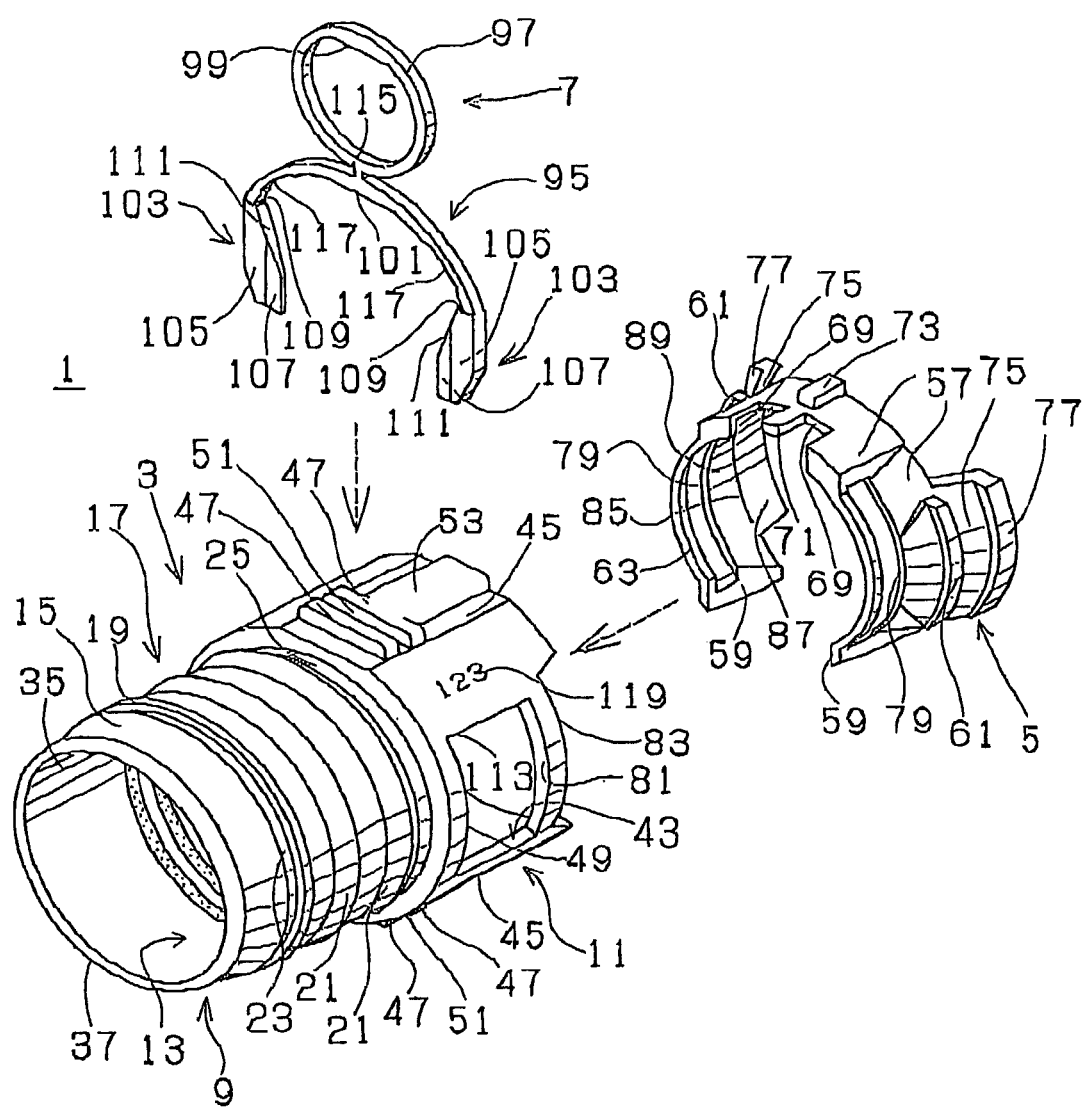
FIG. 1 is an exploded perspective view of a quick connector according to the present invention.
Figure 2:
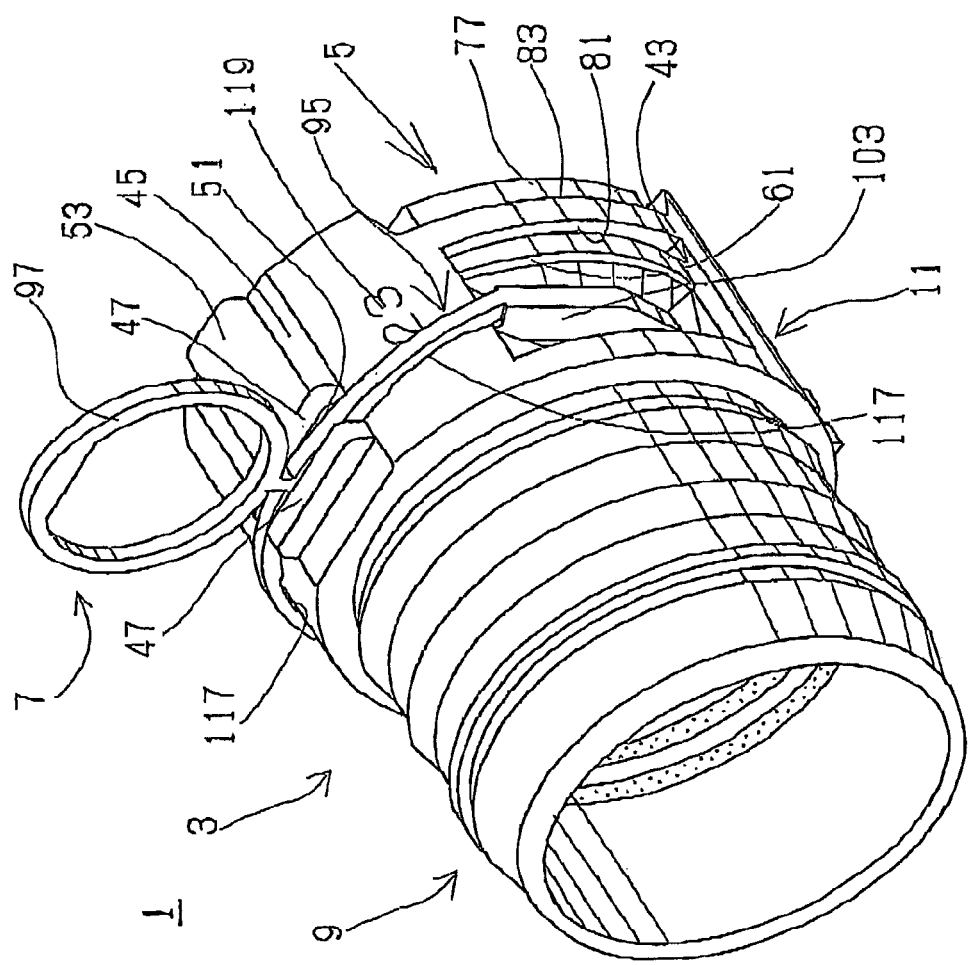
FIG. 2 is an assembled view of the quick connector according to the present invention.

A quick connector 1, which is adapted for assembly in a gasoline fuel piping of an automobile, as shown in FIG. 1, comprises a tubular connector housing 3, a generally annular retainer 5 and a checker 7 for verifying complete connection between a pipe and the quick connector 1 itself.

Figure 4:
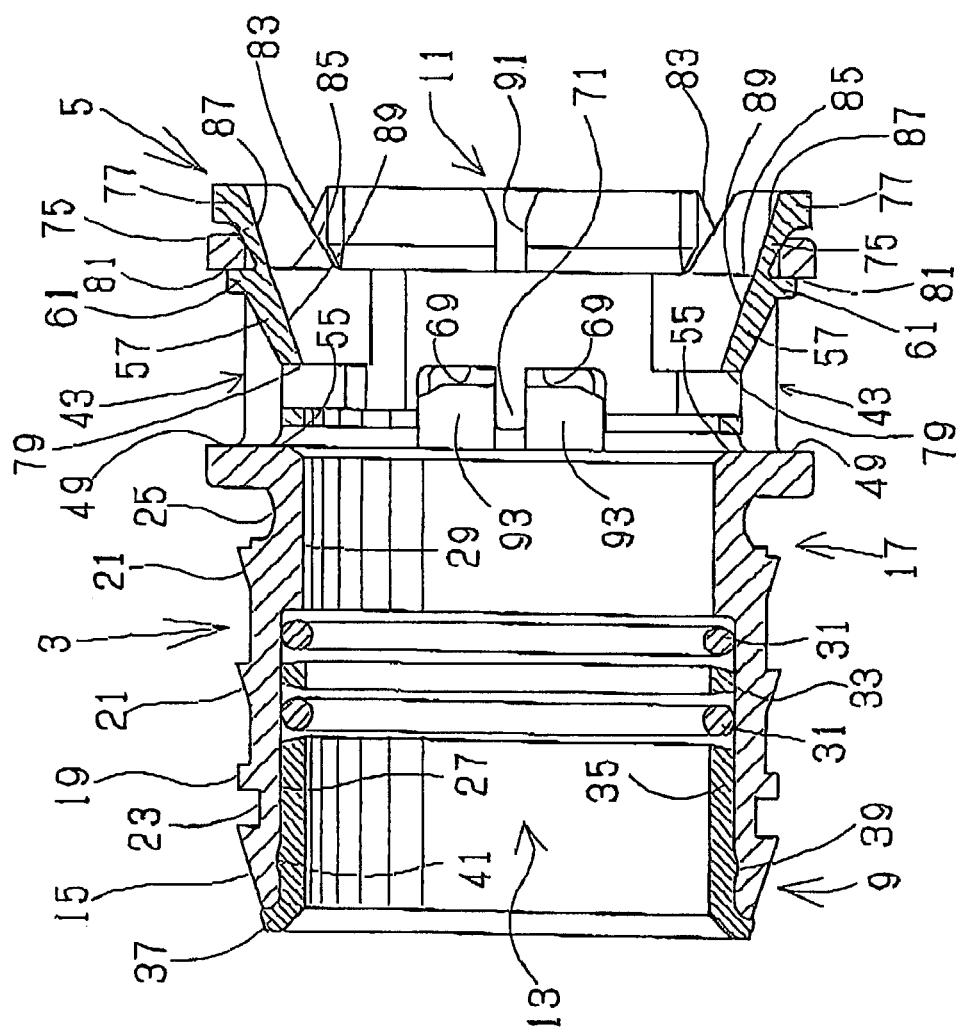
FIG. 4 is a plan sectional view taken in an axial direction of a retainer fitted in a connector housing.
Figure 5:
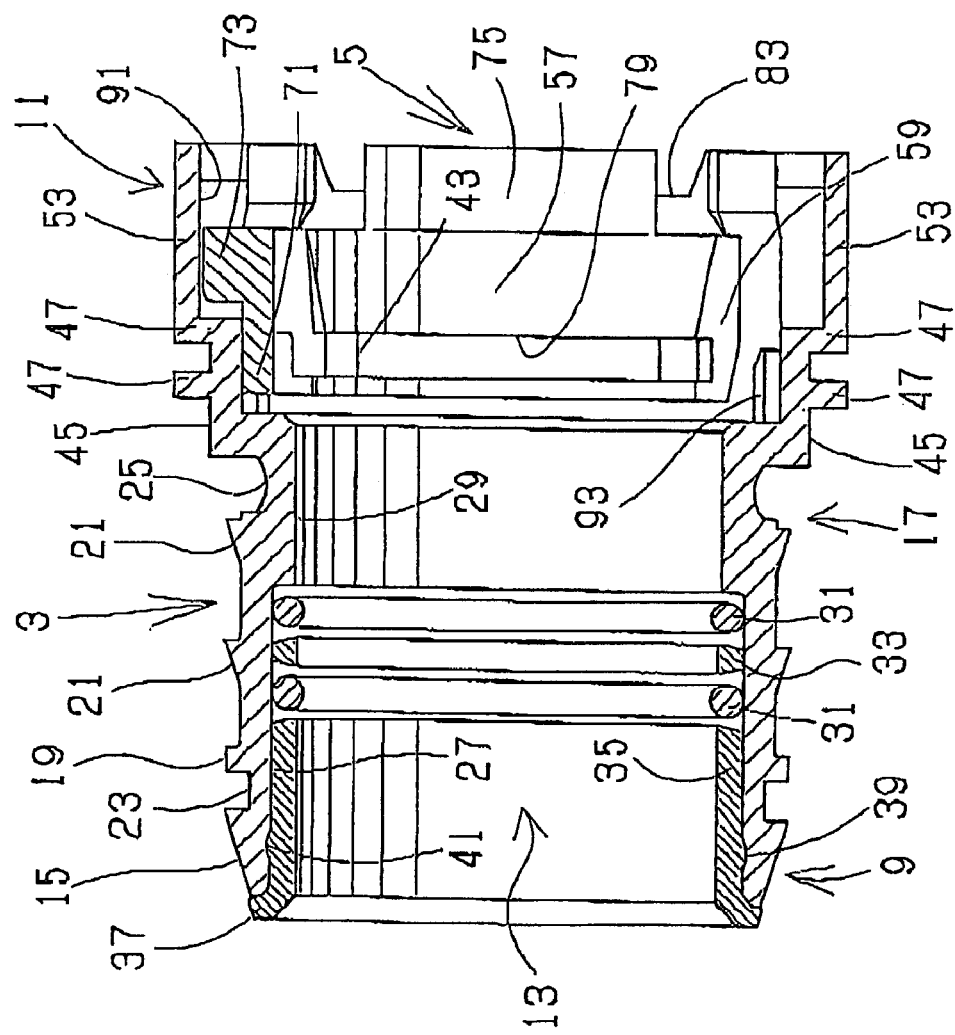
FIG. 5 is a front sectional view taken in an axial direction of the retainer fitted in the connector housing.

As well shown in FIGS. 1 and 4, the connector housing 3 made of glass fiber reinforced polyamide (PA-GF), integrally comprises a cylindrical resin tube connecting portion 9 on one axial side thereof and a generally cylindrical retainer holding portion 11 on an opposite axial side thereof and is provided with a through-bore 13 through from one axial end to an opposite axial end thereof. The resin tube connecting portion 9 comprises one axial side portion 15 of right-angle triangle in cross-section having an outer peripheral surface expanding gently in diameter toward an opposite axial side, and an opposite axial side portion 17 having an outer peripheral surface extending like a simple cylindrical shape on an opposite axial side from the one axial side portion 15. The opposite axial side portion 17 is provided on an outer peripheral surface with an annular projecting stop portion 19 of rectangular in cross-section and two annular projecting stop portions 21, 21 of right-angle triangle in cross-section expanding in diameter toward an opposite axial side. The annular projecting stop portion 19 and the annular projecting stop portions 21, 21 are arranged in axially spaced relation sequentially from one axial side to an opposite axial side. A resin tube (not shown), for example, a resin pipe member is tightly fitted on and connected to an outer periphery or an outer peripheral surface of the resin tube connecting portion 9. A rubber hose or a SUS pipe member may be also adapted for member to be connected with a tube connecting portion of a quick connector of the present invention. An outer peripheral surface 23 on one axial end portion of the opposite axial side portion 17, namely a portion between the one axial side portion 15 and the annular projecting stop portion 19 is formed in small diameter or in deep annular groove, while an outer peripheral surface 25 on the opposite axial end portion thereof, namely a portion from an opposite axial side slightly from the annular projecting stop portion 21 of an opposite axial side to the retainer holding portion 11, is formed in smaller diameter or in deeper groove compared to the outer peripheral surface 23 on one axial end portion thereof. An O-ring for sealing is fitted around the outer peripheral surface 23 on one axial end portion of the opposite axial side portion 17 to provide a sealing between the resin tube connecting portion 9 and the resin tube.

As well shown in FIG. 4, an inner peripheral surface of the resin tube connecting portion 9 comprises a large diameter portion 27 on one axial side thereof and a small diameter portion 29 on an opposite axial side thereof. Within the large diameter portion 27, a pair of O-rings 31, 31 are fitted axially in side by side relation with intervening a collar 33 therebetween on an opposite axial side thereof, and a resin bush 35 is fitted on one axial side thereof. The resin bush 35 is formed generally in a cylindrical shape, and has integrally an annular engagement portion 37 on one axial end portion thereof. The resin bush 35 is provided with a low annular projection 39 on an outer peripheral surface near one axial end thereof. The annular engagement portion 37 is formed so as to project somewhat radially outwardly. The resin bush 35 has an inner diameter substantially identical to an inner diameter of the small diameter portion 29, and is fitted in the large diameter portion 27 so that the annular projection 39 seats in a shallow annular groove 41 formed near one axial end of the large diameter portion 27 and the annular engagement portion 37 engages with one axial end portion of the resin tube connecting portion 9. The O-ring 31, 31 are axially maintained in a space between the resin bush 35 and a stepped surface or radial surface between the small diameter portion 29 and the large diameter portion 27.

Figure 6:
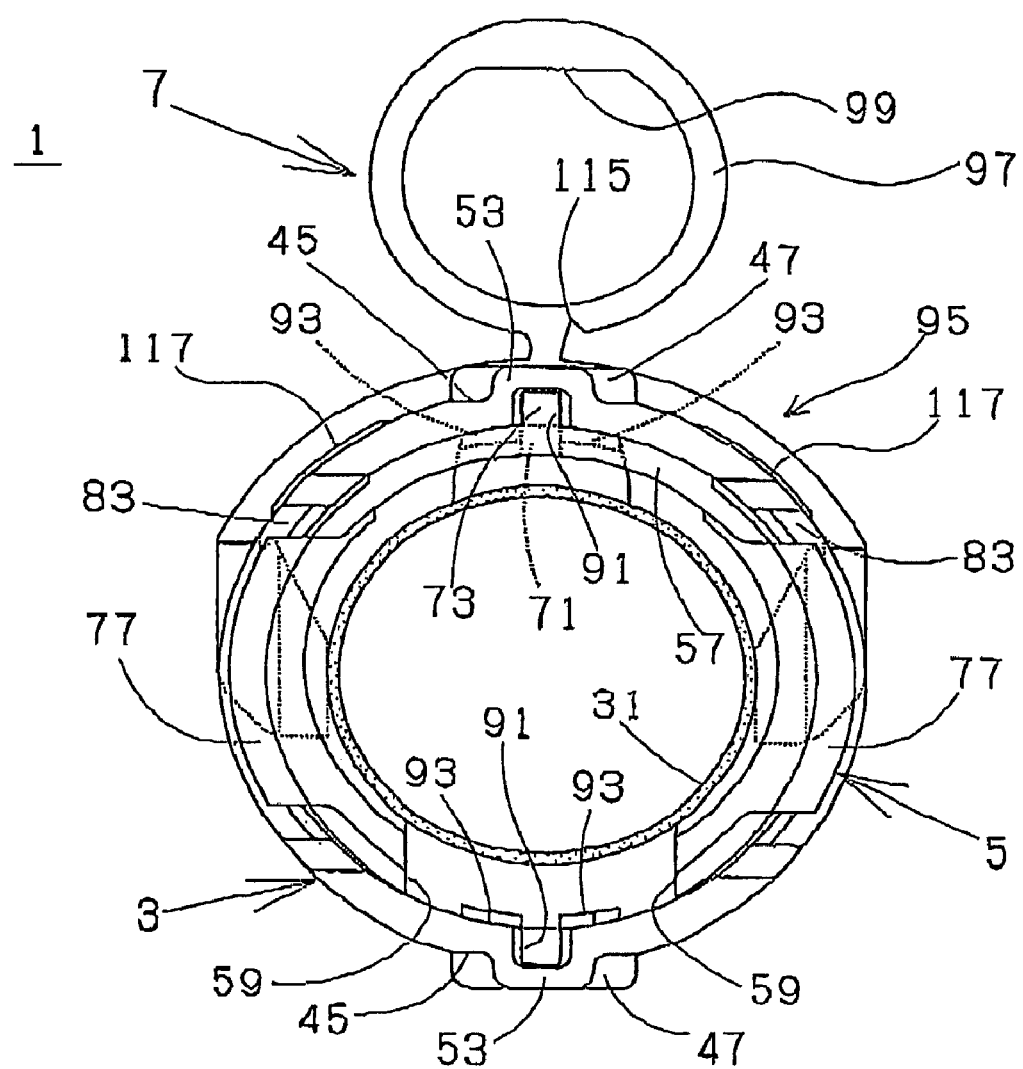
FIG. 6 is a side elevational view of the quick connector according to the present invention.
Figure 7:
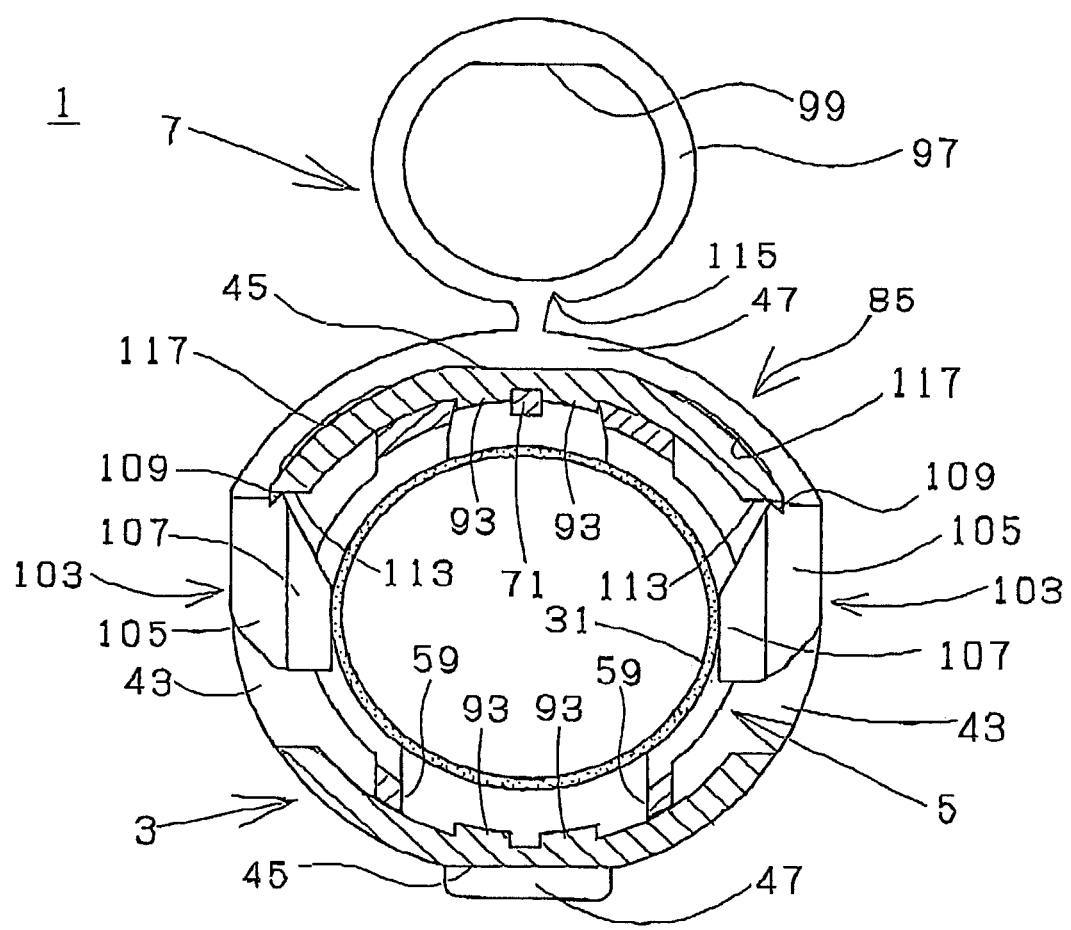
FIG. 7 is a sectional view taken in a radial direction of the quick connector according to the present invention.

As well shown in FIGS. 1, 4 and 6, the generally cylindrical retainer holding portion 11 of a larger diameter than the resin tube connecting portion 9, is provided with engagement windows 43, 43 of uniform configuration in diametrically symmetrical positions and in opposed relation with one another, and flat regions 45, 45 of uniform shape on outer peripheral surfaces respectively between the engagement windows 43, 43 in diametrically symmetrical positions. The flat region 45 extends entire axial length of the retainer holding portion 11 with width or a circumferentially length of substantially one third of an outer diameter of the retainer holding portion 11. Two elongate ribs 47, 47 of uniform shape are formed on one flat region 45 and the other flat region 45 respectively on one axial side thereof. The elongate ribs 47, 47 are located parallel with one another, in axially slightly spaced relation with one another. Each elongate rib 47 extends circumferentially the entire width, or from one circumferentially end to the other circumferentially end of the flat region 45. The elongate rib 47 of one axial side is located toward an opposite axial side compared to one axial ends 49, 49 of the engagement windows 43, 43, and thereby a fit-in slot or an axial space 51 defined by the elongate ribs 47, 47 is located somewhat toward an opposite axial side compared to the one axial ends 49, 49 of the engagement windows 43, 43.

Each flat region 45 is provided with a raised portion 53 (a portion raised radially outwardly) at the midportion widthwise, on an opposite axial side thereof. Each raised portion 53 is uniform in shape and extends axially from an opposite axial end of the flat region 45 continuing to the elongate rib 47 of an opposite axial side at the same height as the elongate rib 47. The retainer holding portion 11 is internally provided with a narrow annular end surface 55 expanding radially inwardly on one axial end. The annular end surface 55 is coplanar with the one axial ends or the one axial end surfaces 49, 49 of the engagement windows 43, 43. That is, no step or no stepped portion exists between the one axial ends 49, 49 of the engagement windows 43, 43 and the annular end surface 55.

As well shown in FIGS. 1 and 4, the retainer 5 made of PA is fitted in the retainer holding portion 11. This retainer 5 is relatively flexible, and is formed so as to be resiliently deformable. The retainer 5 has a main body 57 of C-shape in cross-section, namely generally annular shape wherein a relatively large space for deformation is defined between circumferentially opposite end portions 59, 59 thereof. The main body 57 is provided with a pair of engagement tabs 61, 61 projecting radially outwardly in diametrically symmetrical positions of an opposite axial end portion thereof. Each engagement tab 61 is uniform in shape. An inner surface of the main body 57, except a portion diametrically opposed to the space for deformation, is tapered generally in the direction toward one a side thereof so as to reduce gradually an inner diameter thereof. And, apart from a portion diametrically opposed to the space for deformation, one axial end portion 63 of the main body 57 is formed with an inner diameter almost identical to a pipe (refer to a reference numeral 65 in FIG. 10), and smaller than an annular engagement projection (refer to a reference numeral 67 in FIG. 10). The portion diametrically opposed to the space for deformation of the main body 57 has an inner surface like a portion of a cylindrical inner surface shape, and also has an outer surface like a portion of a cylindrical outer surface shape. One axial side of a portion diametrically opposed to the space for deformation of the main body 57 is formed with a pair of indents 69, 69 circumferentially or widthwise in side by side relation with intervening a narrow section 71 extending in a direction toward one axial side. Each indent 69 is uniform in shape. And, an engagement protrusion 73 of generally square in cross-section is formed integrally at the midportion circumferentially or widthwise on an outer surface of a portion opposed to the space for deformation of the main body 57. The engagement protrusion 73 extends from an opposite axial end to just short of an axial center of the portion opposed to the space for deformation of the main body 57 or the outer surface thereof.

A pair of operation arms 75, 75 are formed integrally on an opposite axial end portion of the main body 57 of the retainer 5 so as to extend inclining radially outwardly in an opposite axial direction from respective circumferentially positions corresponding to the engagement tabs 61, 61. The operation arm 75 respectively, has a latching end 77 projecting radially outwardly on an opposite axial end portion thereof. The one axial end portion 63 of the main body 57 is provided with engagement slits 79, 79 (pipe engagement portion) extending circumferentially in opposed relation with one another. Thus configured retainer 5 is inserted and fitted in the retainer holding portion 11 from an opening on the opposite axial end thereof, so that the engagement tabs 61, 61 seat in the engagement windows 43, 43 of the retainer holding portion 11 in engagement or engageable relation with opposite axial ends 81, 81 of the engagement windows 43, 43 and that the latching ends 77, 77 seat in a pair of receiving recessed portions 83, 83 of the retainer holding portion 11 in engagement relation therewith. The receiving recessed portions 83, 83 are formed on an opposite axial end portion of the retainer holding portion 11 at respective circumferentially positions corresponding to the engagement windows 43, 43 so as to receive the latching ends 77, 77 of the operation arms 75, 75. Such construction renders it difficult to exert an external force on the latching end 77, and consequently on the retainer 5. Opposed inner surfaces 85, 85 of the retainer 5 with actuate shape in cross-section which are extending respectively from the operation as 75, 75 to the engagement slits 79, 79 are generally tapered respectively in a direction of one axial side toward the center or the central axis of the retainer 5. Each of the tapered inner surface 85, 85 of the retainer 5 comprises a tapered inner surface 87 of the operation arm 75 and a tapered inner surface 89 of the main body 57. The opposed inner surfaces 89, 89 of the main body 57 are tapered respectively at somewhat smaller angle or somewhat gently than the inner surfaces 87, 87 of the operation arms 75, 75. And then the retainer 5 is configured so that the annular engagement projection 67 of the pipe 65 necessarily or substantially necessarily abuts the opposite axial ends of the opposite tapered inner surfaces 89, 89 of the main body 57 when the pipe 65 is inserted in the main body 57 of the retainer 5 from the side of the latching ends 77, 77 of the operation arms 75, 75. That is, the annular engagement projection 67 of the pipe 65 abuts the tapered inner surface 85, 85 of the retainer 5 at a boundary between the operation arms 75, 75 and the main body 57 at insertion of the pipe 65.

As well shown in FIGS. 4, 5, 6 and 7, an engagement recess 91 of generally square in cross-section formed in an inner peripheral surface of the retainer holding portion 11 by or in respective raised portion 53. The engagement recess 91 extends along the raised portion 53 from an opposite axial end of the retainer holding portion 11 to one axial end of the raised portion 53. The engagement recess 91 is, for example, except an opposite axial end portion, shaped generally identical in cross-section to the engagement protrusion 73. Therefore, while the retainer 5 is fitted in the retainer holding portion 11, the engagement protrusion 73 is inserted and fitted in the engagement recess 91 or in one axial side of the engagement recess 91 in engagement relation therewith circumferentially. Also, two rotation preventive projections 93, 93 of identical shape are provided in an inner peripheral surface of the retainer holding portion 11 on one axial end portion thereof. Each of the rotation preventive projections 93, 93 is thin, and projecting somewhat radially inwardly. Each of the rotation preventive projections 93, 93 is formed generally identical in shape to the indent 69 of the retainer 5. Therefore, while the retainer 5 is fitted in the retainer holding portion 11, each rotation preventive projection 93 is in fitting relation in each indent 69 and in engagement relation therewith circumferentially. The other set of the rotation preventive projections 93, 93 are formed in diametrically symmetrical position so that the retainer 5 can be fitted in the retainer holding portion 11 in the same way even while rotated 180 degrees from its position shown in FIG. 1. Although an engagement recess (for example, numeral reference 91) is shaped identical in cross-section to an engagement protrusion (for example, numeral reference 73) in the embodiments shown in Figs., it is not necessarily required. The engagement recess may be of any shape engageable with the engagement protrusion 73 to restrain movement of a retainer (for example, numeral reference 5) in circumferentially direction, or in circumferentially and radial directions.

Figure 8:
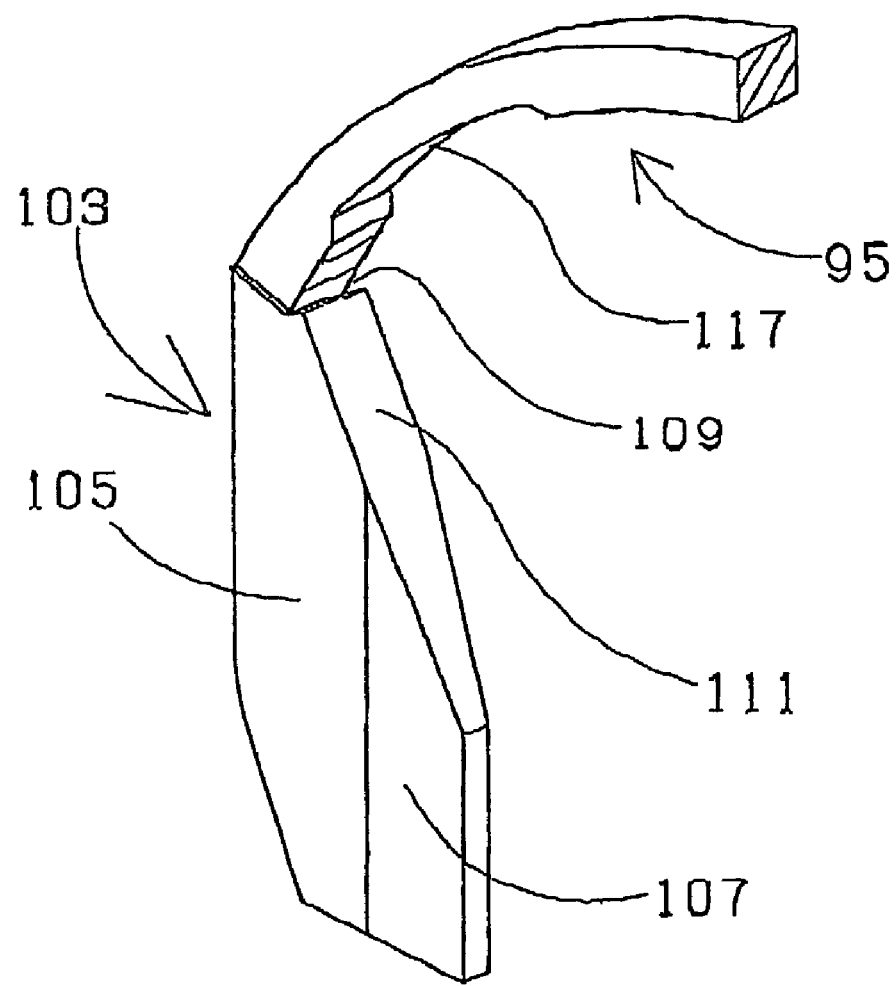
FIG. 8 is an enlarged view of a portion of an inwardly directed engagement portion of a checker.

As well shown in FIGS. 1, 2, 6 and 7, the checker 7 is fitted on an outer periphery or an outer peripheral surface of the connector housing 3. The checker 7 is made of polyacetal (POM) and is formed relatively flexible, and resiliently deformable. The checker 7 has a thin-walled checker body 95 curving along an arc of a diameter generally identical to an outer peripheral surface of the connector housing 3. The checker body 95 is provided integrally with a pull-ring 97 having a flat fingerhold portion (straight portion) 99 at a portion of an inner peripheral surface thereof on an opposite side of the checker body 95, at the widthwise center part of an outer portion or outer peripheral portion thereof. Further, the checker body 95 is formed with a flat portion (straight portion) 101 at the widthwise center part on an inner surface or inner peripheral surface thereof, of which length is substantially identical to the width of the flat region 45 of the connector hosing 3. Furthermore, the checker body 95 is provided integrally with inwardly directed engagement portions 103, 103 projecting in a widthwise inward direction or a radially inwardly direction on opposite widthwise ends thereof. Each inwardly directed engagement portion 103 integrally comprises base portion 105 widthwise or radially outside, and push-out portion 107 widthwise or radially inside. Each base portion 105 is formed with wall somewhat thicker than the checker body 95, in integrally connecting relation with a respective one of the opposite ends of the checker body 95. Each push-out portion 107 includes both side surfaces in a direction of thickness thereof or in an axial direction (namely, in an axial direction of the quick connector 1, the connector housing 3 or the retainer holding portion 11) which are symmetrically gently inclined so as to be gradually thinner radially inwardly. A widthwise or radially inner end of the push-out portions 107 extends in a direction perpendicular to the direction of the flat portion 101 extending. Each of the base portions 105, 105 includes a short stop engagement surface 109 as a stopper or a locking portion (refer to FIG. 8) inside or radially inside of a root position thereof (a position bordering the checker body 95 and the base portion 105) being somewhat ramped toward inward or radially inward direction in a pull-out direction (in a direction of the flat portion 101: in a direction shown by an arrow in FIG. 9). That is, the short stop engagement surfaces 109, 109 are ramped inwardly upwards in FIGS. 1 and 7. Each inwardly directed engagement portion 103 includes retaining surface 111 ramped toward a fit-on direction (refer to a vertical arrow in FIG. 1) inwardly or radially inwardly and extending from inner or radially inner end of the short stop engagement surface 109 toward inner or radially inner end of a respective push-out portion 107. Widthwise or radially outward portion of each retaining surface 111 is defined by the base portion 105 while widthwise or radially inner portion thereof is defined by the push-out portion 107.

Figure 3:
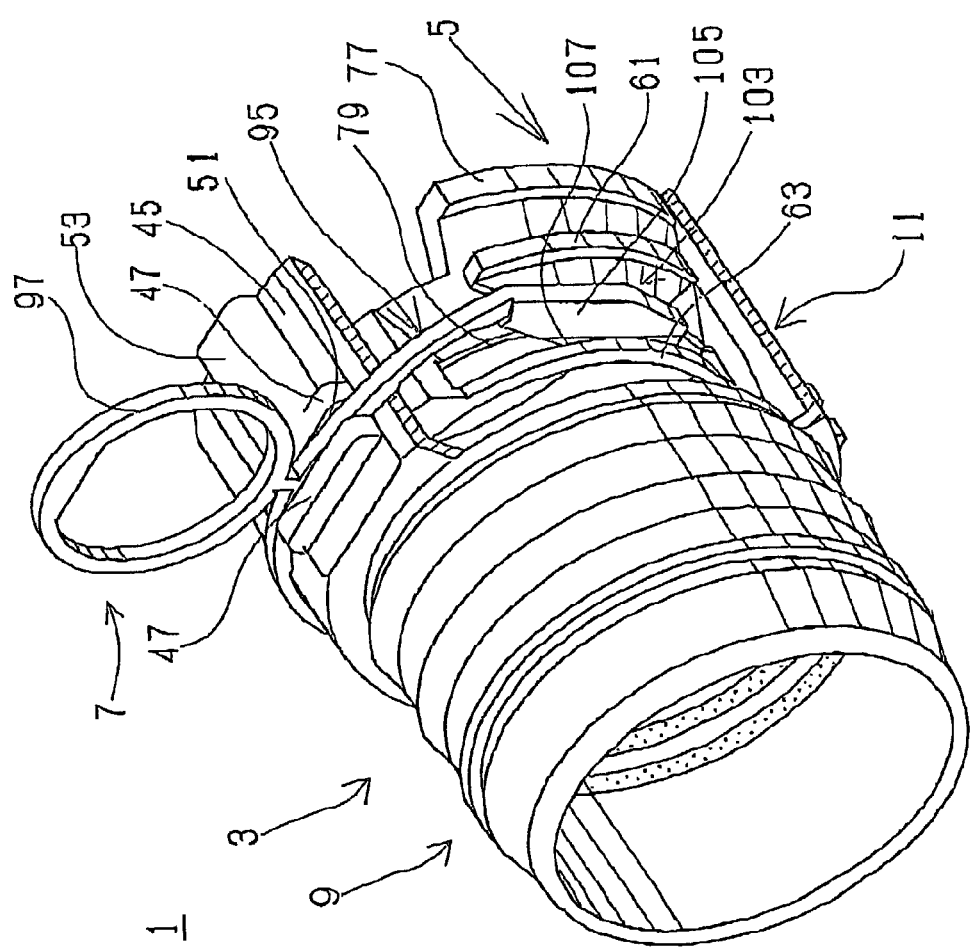
FIG. 3 is a partly-broken, assembled view of the quick connector according to the present invention.

Thus configurerd checker 7 is fitted or mounted along an outer peripheral surface of the connector housing 3 or embracing an outer peripheral surface of the connector housing 3 in contacting relation entirely therewith, so that the position of the flat portion 101 is fitted in the fit-in slot 51 defined by the elongate ribs 47, 47 on the flat region 45 of the connector housing 3 in contact with the flat region 45, each of the inwardly directed engagement portions 103, 103 enters in the engagement window 43, and each of the short stop engagement surface 109 (here inner end portion, radially inner end portion or radially inner end of the short stop engagement surface 109) engages with one circumferentially end 113 of the engagement window 43. The checker 7 is thereby fitted on the connector housing 3 not to be pulled out due to engagement or locking engagement between the short stop engagement surface 109, 109 and the one circumferentially ends 113, 113 of the engagement windows 43, 43, even if the pull-ring 97 is pulled in a pull-out direction (a vertically outward direction from the flat region 45). The checker 7 is being fitted on the connector housing 3 by sliding the inwardly directed engagement portions 103, 103 over an outer peripheral surface of the connector housing 3 toward the engagement windows 43, 43 respectively. As the inwardly directed engagement portions 103, 103 are progressively slid over an outer peripheral surface of the connector housing 3, the checker body 95 is resiliently deformed in an opening direction. On reaching the engagement windows 43, 43, the inwardly directed engagement portions 103, 103 enter therein respectively under spring back force of the checker body 95, resulting snap-engagement between the short stop engagement surfaces 109, 109 and the one-circumferentially ends 113, 113 of the engagement windows 43, 43. Referring specifically to FIGS. 3 and 6, the radially inner ends of the inwardly directed engagement portions 103, 103 seat in the engagement slits 79, 79 of the retainer 5 through the engagement windows, 43, 43, and a distance between radially inner ends of the inwardly directed engagement portions 103, 103 is generally identical to an outer diameter of the pipe 65. Further, as a distance between the elongate ribs 47, 47, namely width of the fit-in slot 51 is designed generally identical to thickness of a position of the flat portion 101 of the checker body 95, the checker 7 is never inclined, for example, if the pull-ring 97 is pulled in an axially inclining direction. The checker 7 can be fitted on the connector housing 3 likewise from either side of one flat region 45 or the other flat region 45. Furthermore, the checker 7 is configured so as to fit on the connector housing 3 similarly either with a surface of one side or a surface of an opposite side toward one axial side, in bi-directional manner.

And, as well seen FIGS. 1 and 6, a cut-away 115 is formed in the pull-ring 97 outside around a root portion thereof. The cut-away 115 allows the pull-ring 97 to break when the checker 7 is pulled by force. That prevents the checker 7 from being pulled out, when the pipe 65 is incompletely connected with the quick connector 1 and the checker 7 is pulled by strong force. Further, as well seen in FIGS. 2 and 6, the checker body 95 is provided with recessed portions 117, 117 on opposite widthwise sides of an inner surface thereof to receive a raised type number 119 formed in relief on an outer peripheral surface of the connector housing 3 therein, thereby preventing the checker 7 from loosing off an outer peripheral surface of the connector housing 3.

Figure 9:
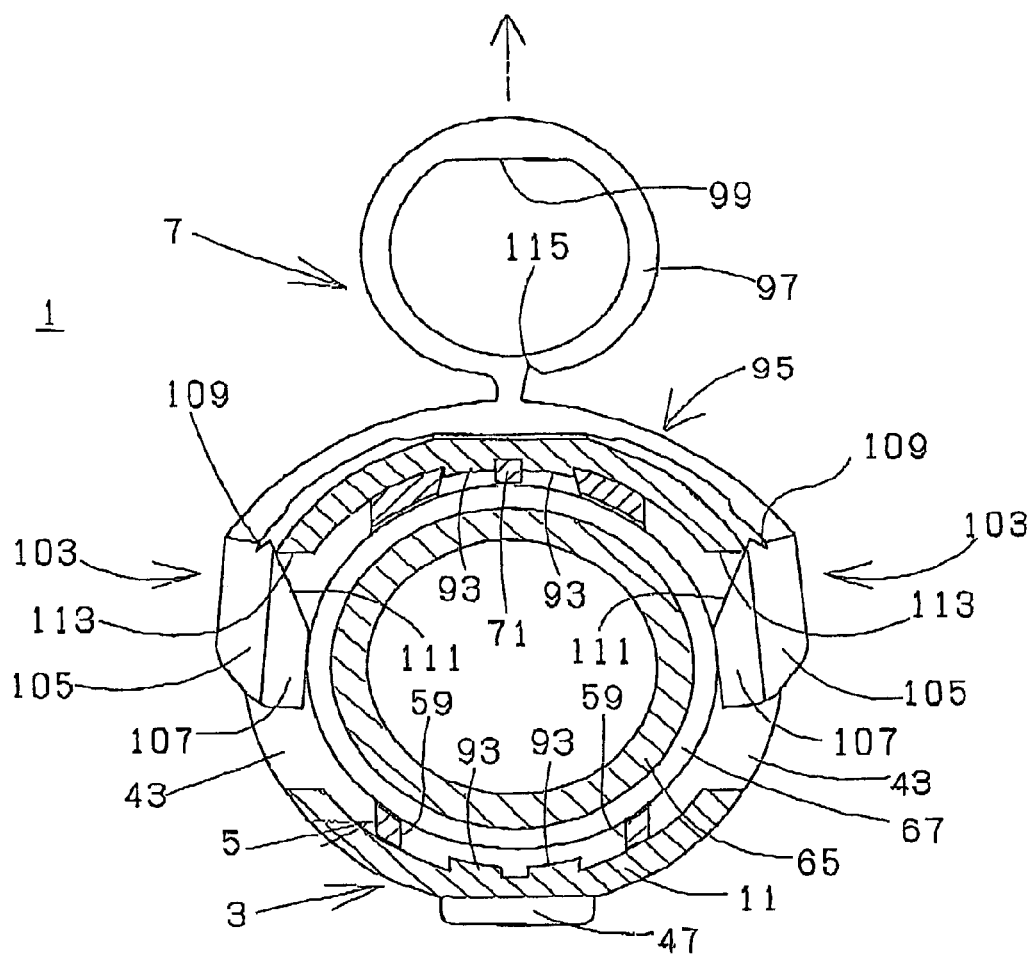
FIG. 9 is a sectional view taken in a radial direction showing the quick connector according to the present invention wherein a pipe is inserted and connected.
Figure 10:
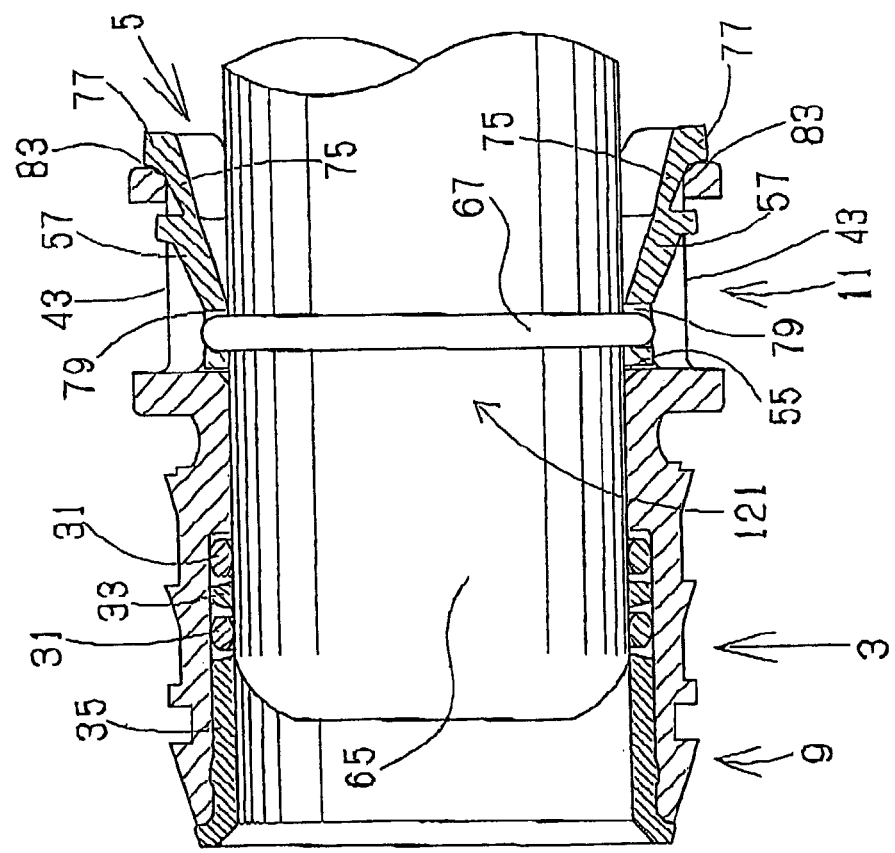
FIG. 10 is a sectional view taken in an axial direction showing the quick connector according to the present invention wherein the pipe is inserted and connected, and then the checker is pulled out.

As well shown in FIGS. 9 and 10, the pipe 65, for example to be joined with the tube, which is made of metal, is inserted in the quick connector 1 from an opening on an opposite axial end of the retainer holding portion 11, more specifically, in the main body 57 of the retainer 5 from a side of the latching ends 77, 77 of the operation arms 75, 75, and is to be fitted in the quick connector 1. The pipe 65 has an inserting end portion 121 wherein the annular engagement projection 67 is formed on an outer peripheral surface, at one axial end side thereof. The pipe 65 is pushed, and fittingly inserted into the quick connector 1 or connector housing 3 so that the annular engagement projection 67 progresses radially expanding inner surface of the main body 57 of the retainer 5 until the annular engagement projection 67 seats in the engagement 79, 79 in snap-engagement relation therewith. The annular engagement projection 67 which has fitted and snap-engaged in the engagement slits 79, 79 of the main body 57 of the retainer 5 blocks or limits further axial in-and-out movement of the pipe 65 with respect to the quick connector 1. That is, the pipe 65 is thereby almost locked against relative axial movement in the quick connector 1. One axial end or inserting end of the pipe 65 reaches in the resin bush 35 fitted in the resin tube connecting portion 9 beyond a pair of the O-rings 31, 31 provided in the resin tube connecting portion 9 and thereby a seal is formed by the O-rings 31, 31 between an outer periphery surface of the pipe 65 and an inner periphery surface of the quick connector 1. The retainer 5 is usually fitted loosely in the retainer holding portion 11 with slight axial play therein. However, at least when the pipe 65 is fully inserted therein, one axial end of the main body 57 is located close to the annular end surface 55 and the engagement protrusion 73 of the retainer 5 is located close to one axial end of the engagement recess 91. At that time, each of the latching ends 77, 77 is in abutment relation with respect to the respective receiving recessed portion 83. An inner diameter of the small diameter portion 29 of the resin tube connecting portion 9 and an inner diameter of the resin bush 35 are designed generally identical to an outer diameter of the pipe 65.

When an inserting end portion 121 of the pipe 65 is inserted in the main body 57 of the retainer 5 and the annular engagement projection 67 of the pipe 65 reaches a position of opposite axial ends of the engagement slits 79, 79, the annular engagement projection 67 abuts radially inner end portions of the inwardly directed engagement portions 103, 103 or push-out portions 107, 107 of the checker 7 which projects inside of the main body 57 through the engagement slits 79, 79 of the retainer 5 as a result that the main body 57 of the retainer 5 is expanded by the annular engagement projection 67. When the inserting end portion 121 of the pipe 65 has been further inserted, the annular engagement projection 67 is pushing back the inwardly directed engagement portions 103, 103 or push-out portions 107, 107 radially outwardly, and progresses up to a position axially corresponding to the engagement slit 79, 79. As opposite axial side surfaces of radially inner end portions of the inwardly directed engagement portions 103, 103 or of the push-out portions 107, 107, which the annular engagement projection 67 abuts, are inclined toward an inward, or radially inward direction in one axial direction, although slightly, the inwardly directed engagement portions 103, 103 are smoothly guided, deformed and displaced radially outwardly, due to abutment with the annular engagement projection 67. When the annular engagement projection 67 reaches a position axially corresponding to the engagement slits 79, 79, the one axial end portion 63 of the main body 57 of the retainer 5 which is expanded springs back to its original, or generally original dimension, and the annular engagement projection 67 seats and engages in the engagement slits 79, 79 of the main body 57. On the other hand, the inwardly directed engagement portions 103, 103 of the checker 7 are held to be deformed and displaced radially outwardly in abutment relation with the annular engagement projection 67 or portions surrounding the engagement slits 79, 79. In this state, locking engagement relations between the short stop engagement surfaces 109, 109 of the inwardly directed engagement portions 103, 103 and the one circumferentially ends 113, 113 of the engagement windows 43, 43 are released. And the retaining surfaces 111, 111 of the inwardly directed engagement portions 103, 103 are pressed against the one circumferentially ends 113, 113 of the engagement windows 43, 43, and thereby the checker 7 is held in position. Therefore, the checker 7 is not fell off the connector housing 3 quite easily. However, as the retaining surfaces 111, 111 are formed in slightly or gently tapered configuration inwardly, or radially inwardly, the checker 7 can be pulled out of the connector housing 3 easily when the pull-ring 97 is pulled in a pull-out direction (refer to an arrow in FIG. 9). By pull-out of the checker 7, it can be verified that the annular engagement projection 67 is engaged in the engagement slits 79, 79 of the retainer 5 and thereby the pipe 65 is connected with the quick connector 1 correctly.

In the event of removing the pipe 65 from the quick connector 1, the latching ends 77, 77 of the operation arms 75, 75 received in the receiving recessed portions 83, 83 are pressed radially inwardly from outside to narrow a radial space between the operation arms 75, 75, thus a radial space between the engagement tabs 61, 61. And, thereby the engagement tabs 61, 61 are out of the engagement windows 43, 43, and the retainer 5 can be relatively pulled out of the connector housing 3. As the retainer 5 is relatively pulled out of the connector housing 3, the pipe 65 will have been also pulled out of the quick connector 1 or the connector housing 3 along with the retainer 5.

Figure 11:
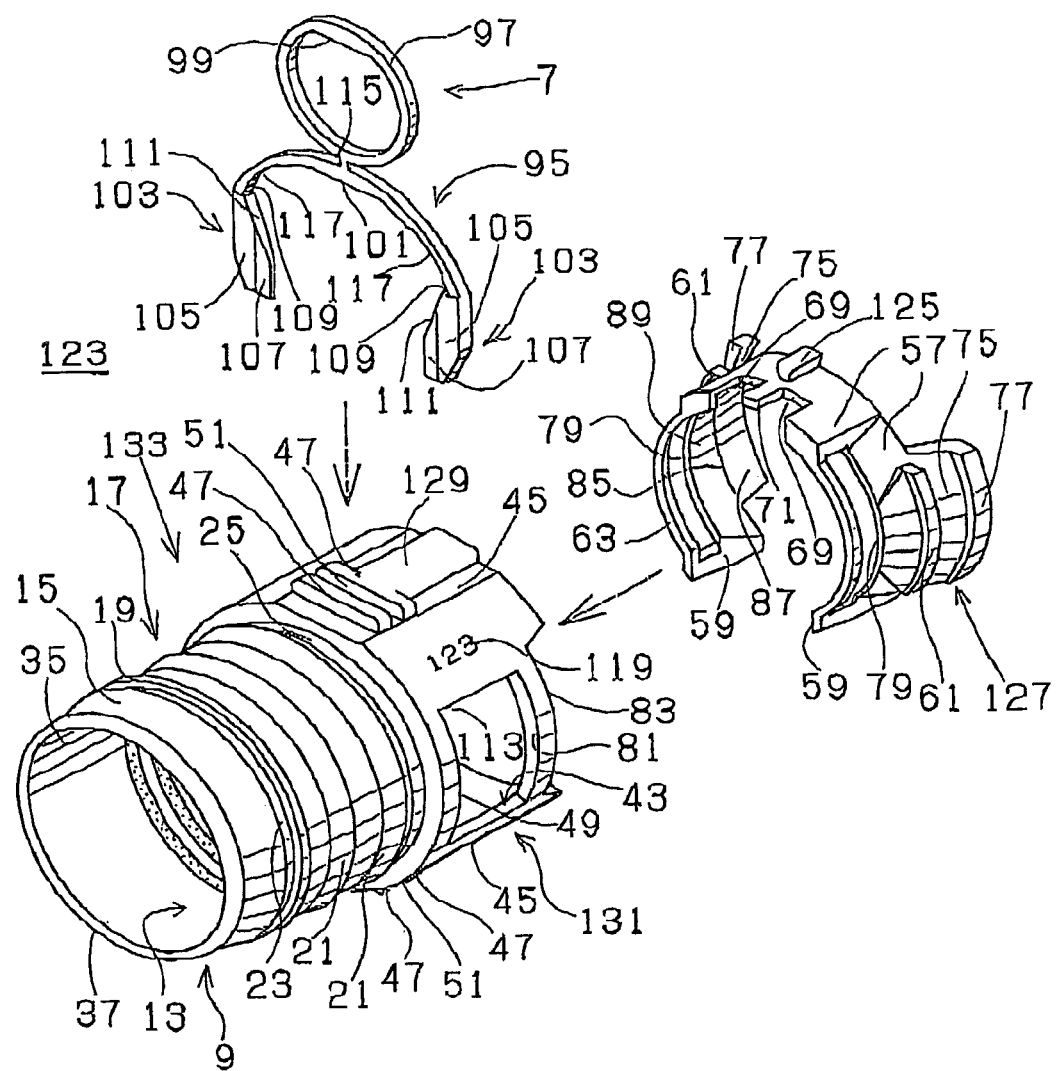
FIG. 11 is an exploded perspective view of a quick connector with another configuration according to the present invention.
Figure 12:
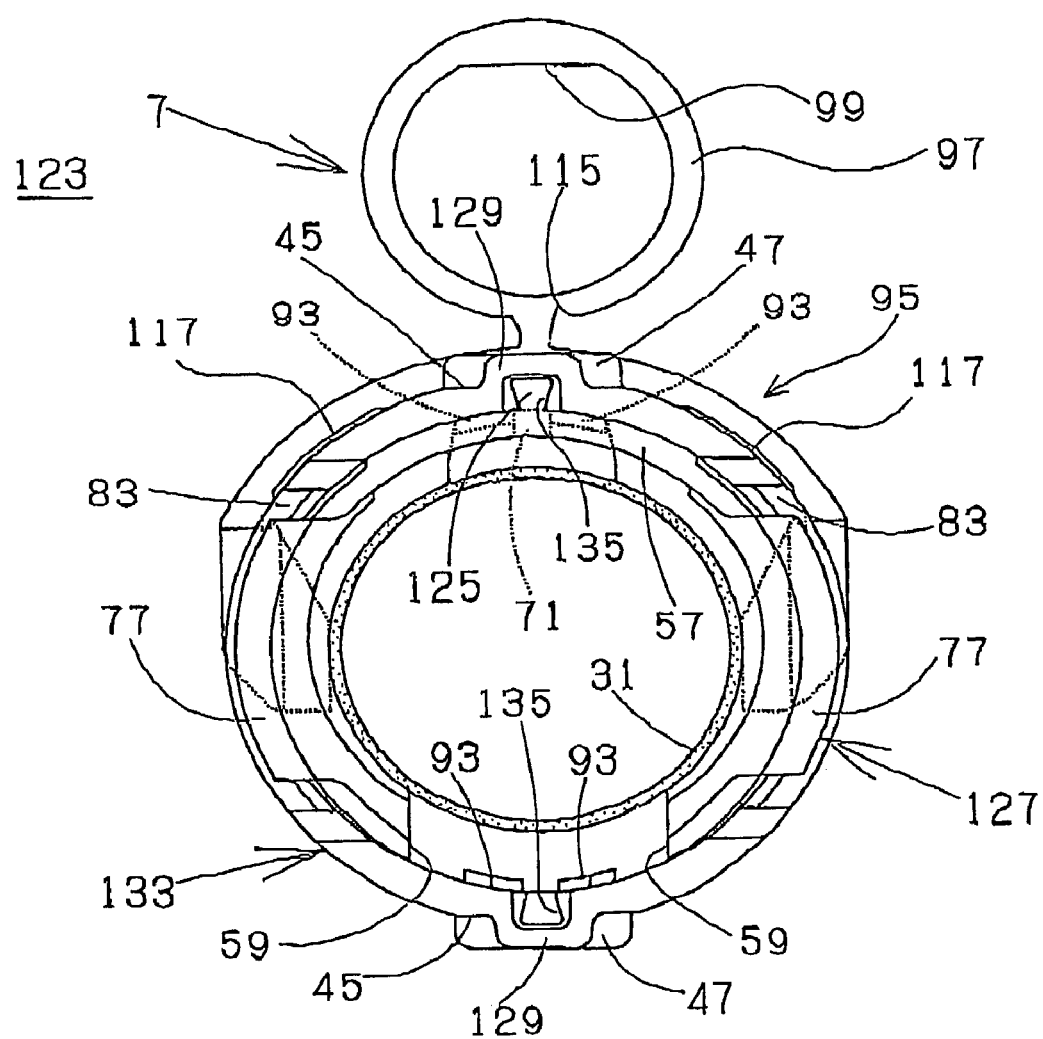
FIG. 12 is a side elevational view of the quick connector with another configuration according to the invention.
Figure 13:
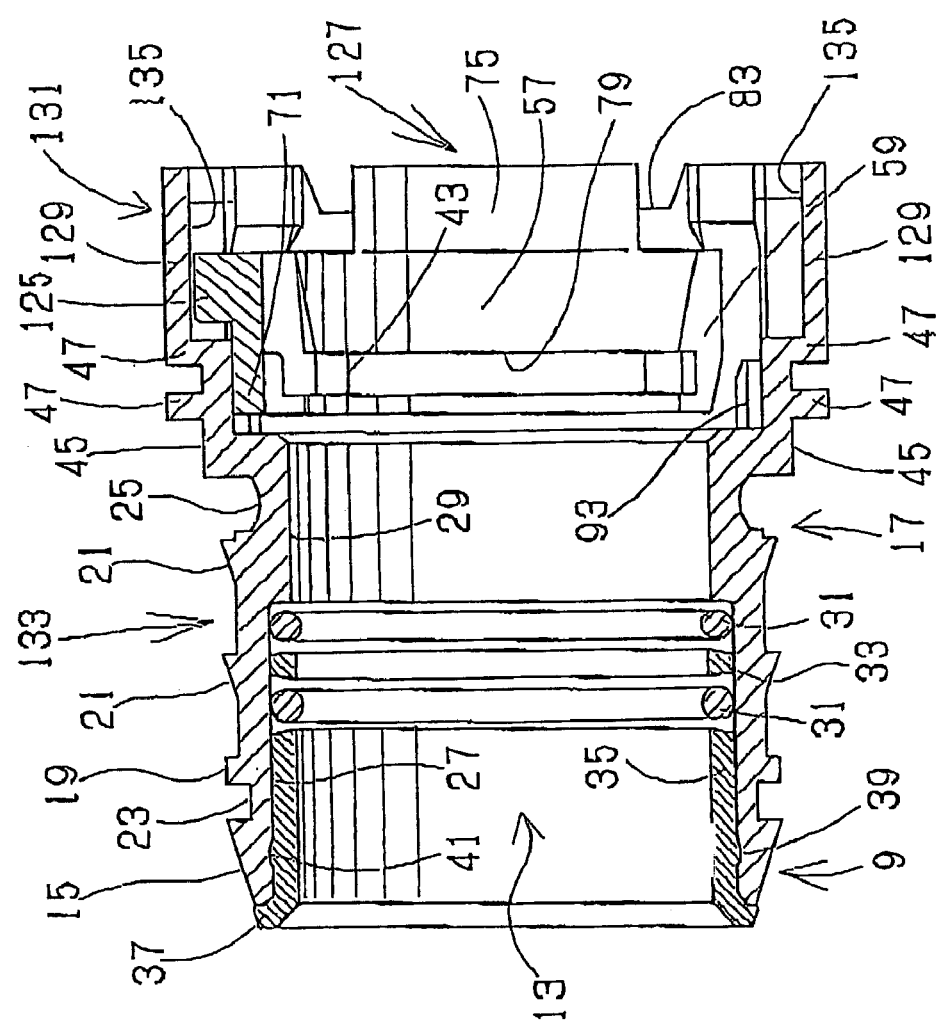
FIG. 13 is a front sectional view taken in an axial direction of the quick connector with another configuration according to the present invention.

FIG. 11 shows a quick connector 123 of another configuration. The quick connector 123 has a modified configuration with respect to the engagement recess 91 and the engagement protrusion 73 of the quick connector 1. Therefore, as to portions of configuration identical to the quick connector 1, identical numeral references are almost given and explanations are almost omitted herein. In the quick connector 123, an engagement protrusion 125 of trapezoid in cross-section is formed integrally at the midportion circumferentially or widthwise on an outer surface of a portion opposed to the space for deformation of the main body 57 of the retainer 127. The engagement protrusion 125 extends from an opposite axial end to just short of an axial center of the portion opposite to the space for deformation of the main body 57 or an outer surface thereof. Raised portions 129, 129 (a portion raised radially outwardly) are formed respectively at the midportion widthwise on opposite axial side of the flat region 45 formed on a retainer holding portion 131 of a connector housing 133. Each raised portion 129 extends axially from an opposite axial end of the flat region 45 continuing to the elongate rib 47 of an opposite axial side at the same height as the elongate rib 47. As seen in FIGS. 12 and 13, an engagement recess 135, for example, except an opposite axial end, of trapezoid in cross-section is formed in an inner peripheral surface of the retainer holding portion 131 by or in respective raised portion 129 and extends along the raised portion 129 from an opposite axial end of the retainer holding portion 131 to one axial end of the raised portion 129. The engagement recess 135 is shaped, for example, except an opposite axial end portion, generally identical in cross-section to the engagement protrusion 125 of the retainer 127. Therefore, while the retainer 127 is fitted in the retainer holding portion 131, the engagement protrusion 125 is inserted and fitted in the engagement recess 135 or in one axial side of the engagement recess 135 in engagement relation therewith radially and circumferentially.

Figure 14:
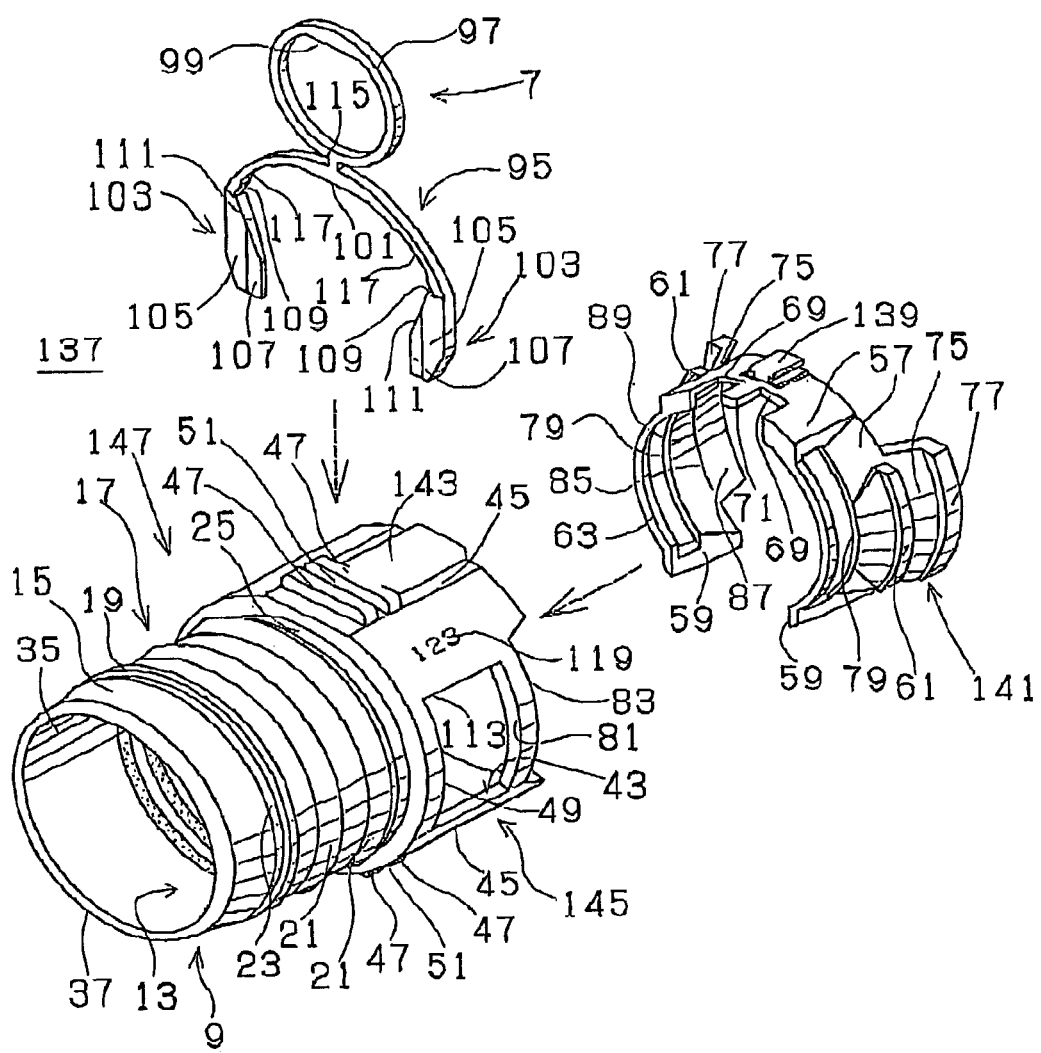
FIG. 14 is an exploded perspective view of a quick connector with yet another configuration according to the present invention.
Figure 15:
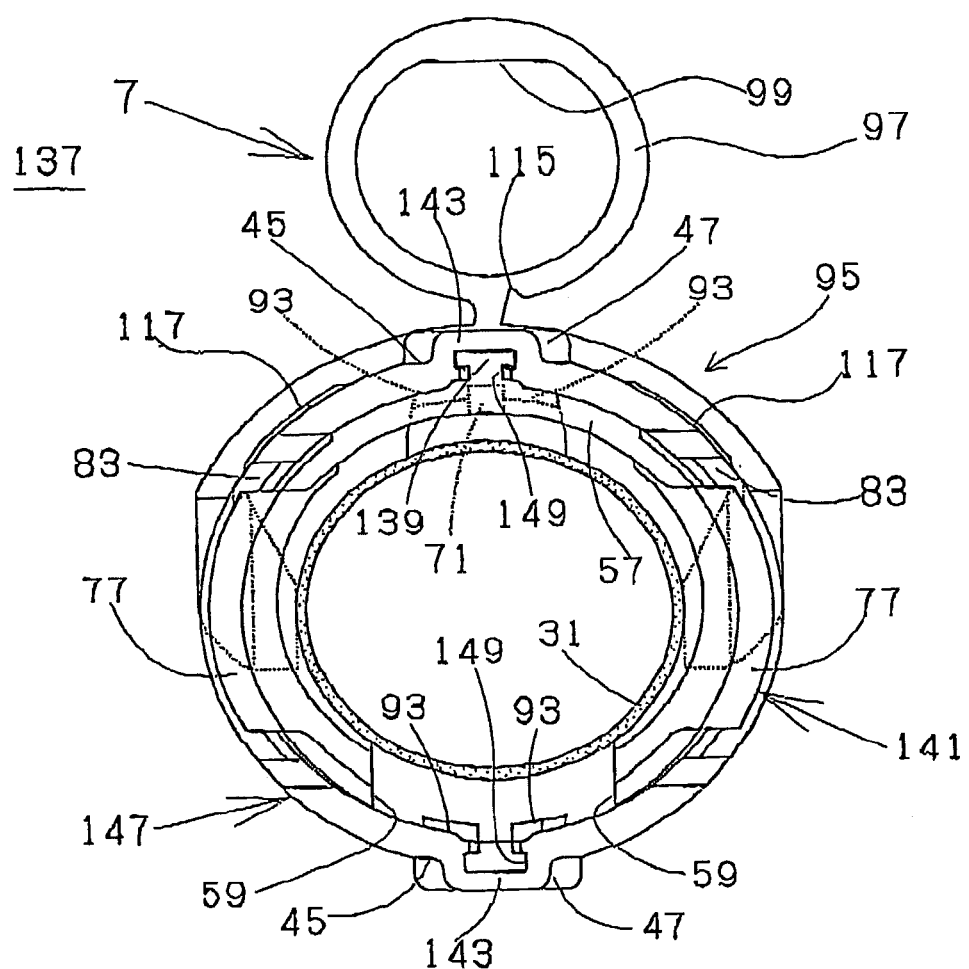
FIG. 15 is a side elevational view of the quick connector with yet another configuration according to the present invention.
Figure 16:
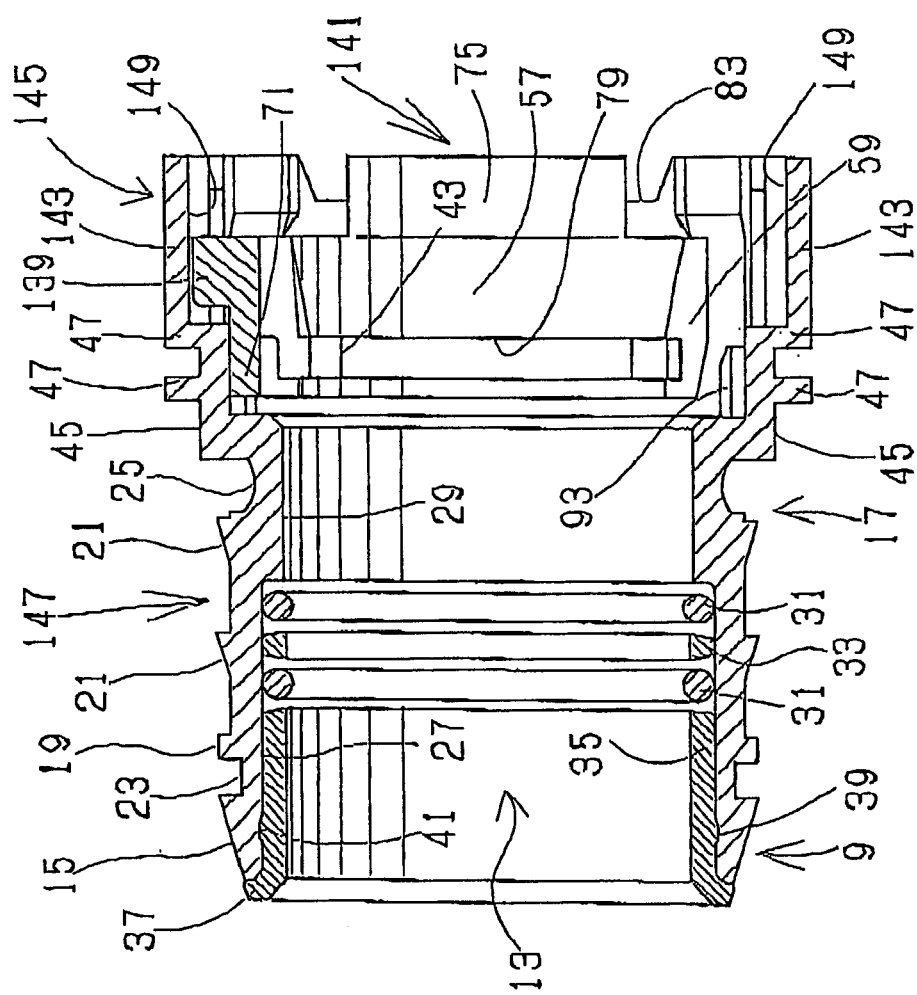
FIG. 16 is a front sectional view taken in an axial direction of the quick connector with yet another configuration according to the present invention.

FIG. 14 shows a quick connector 137 of yet another configuration. The quick connector 137 has a modified configuration with respect to the engagement recess 91 and the engagement protrusion 73 of the quick connector 1. Therefore, as to portions of configuration identical to the quick connector 1, identical numeral references are almost given and explanations are almost omitted herein. In the quick connector 137, an engagement protrusion 139 of T-shape in cross-section is formed integrally at the midportion circumferentially or widthwise on an outer surface of a portion opposed to the space for deformation of the main body 57 of a retainer 141. The engagement protrusion 139 extends from an opposite axial end to just short of an axial center of the portion opposed to the space for deformation of the main body 57 or an outer surface thereof. Raised portions 143, 143 (a portion raised radially outwardly) are formed respectively at the midportion widthwise on opposite axial side of the flat region 45 formed on a retainer holding portion 145 of the connector housing 147. Each raised portion 143 extends axially from an opposite axial end of the flat region 45 continuing to the elongate rib 47 of an opposite axial side at the same height as the elongate 47. As well shown in FIGS. 15 and 16, an engagement recess 149 of T-shape in cross-section is formed in an inner peripheral surface of the retainer holding portion 145 by or in the respective raised portion 143 and extends along the raised portion 143 from an opposite axial end of the retainer holding portion 145 to one axial end of the raised portion 143. The engagement recess 149, for example, except an opposite axial end portion, is shaped generally identical in cross-section to the engagement protrusion 139 of the retainer 141. Therefore, while the retainer 141 is fitted in the retainer holding portion 145, the engagement protrusion 139 is inserted and fitted in the engagement recess 149 or in one axial side of the engagement recess 149 in engagement relation therewith radially and circumferentially.

I claim:

1. A quick connector to be connected with a pipe including an inserting end portion provided with an annular engagement projection, the quick connector comprising:
 a tubular connector housing provided with a tube connecting portion on one axial side thereof and a retainer holding portion on an opposite axial side thereof,
 a retainer including a generally annular main body formed with a pipe engagement portion on one axial end portion thereof to snap-engage with the annular engagement projection of the pipe when the inserting end portion of the pipe is inserted in the connector housing, the main body having exactly one space for deformation extending through the entire axial length of the main body such that the main body is allowed to deform radially inward, the retainer being fitted in and held by the retainer holding portion,
 an engagement protrusion being integrally formed on an opposite axial side of an outer surface of the main body that is opposite the space for deformation so as to project radially outwardly,
 an engagement recess being formed so as to extend from an opposite axial end to one axial side of an inner peripheral surface of the retainer holding portion, and
 the engagement protrusion being fitted in the engagement recess in engagement relation circumferentially and radially inward with respect to the connector housing.

2. The quick connector as set forth in claim 1 wherein the engagement protrusion of the main body and the engagement recess are trapezoidal in cross-section and wherein the narrow ends of the trapezoidal cross sections are positioned radially inward, and a cross-sectional shape of the engagement recess is generally identical to that of the engagement protrusion.

3. The quick connector as set forth in claim 1 wherein the main body is further formed with a plurality of indents in side by side relation to each other circumferentially so as to extend from one axial end to an approximate axial center of the main body, with an intervening narrow parting section or sections extending in one axial direction on one axial side thereof, wherein the retainer holding portion is further formed with a plurality of rotation preventive projections on one axial end portion of an inner peripheral surface thereof, the rotation preventive projections projecting radially inwardly, and
 wherein the rotation preventive projections are fitted in the indents respectively in engagement relation circumferentially.

4. The quick connector as set forth in claim 1 wherein the main body comprises a pair of operation arms formed on opposite sides of the space for deformation, wherein the pair of the operation arms are allowed to be pressed radially inward to deform the main body radially inward, and the engagement protrusion is formed between the pair of the operation arms on the outer surface of the main body.

5. The quick connector as set forth in claim 4 wherein exactly one engagement protrusion is formed on the outer surface of the main body.

6. The quick connector as set forth in claim 1 wherein exactly one engagement protrusion is formed on the outer surface of the main body.

7. The quick connector as set forth in claim 1 wherein the engagement protrusion of the main body extends from an opposite axial end to just short of the one axial end portion of the main body.

8. The quick connector as set forth in claim 1 wherein an outer surface portion of a peripheral wall of the retainer holding portion is raised radially outwardly and the engagement recess is formed in the raised portion.

9. The quick connector as set forth in claim 1, wherein the engagement protrusion fitted in the engagement recess in engagement relation radially inwardly so as not to fall radially inwardly out of said engagement recess.

10. The quick connector as set forth in claim 1, wherein the retainer holding portion is formed with an engagement window, the retainer being fitted in and held by the retainer holding portion in engagement relation with an opposite axial end of the engagement window, and the retainer being head in the retainer holding portion such that an axial position of one axial end of the main body is in the engagement window.

\* \* \* \* \*